(12) United States Patent
Suzuki et al.

(10) Patent No.: US 11,987,424 B2
(45) Date of Patent: May 21, 2024

(54) CONTAINER LID HAVING OXYGEN SHIELDING PROPERTIES

(71) Applicants: SUNTORY HOLDINGS LIMITED, Osaka (JP); NIPPON CLOSURES CO., LTD, Tokyo (JP)

(72) Inventors: Hideyuki Suzuki, Tokyo (JP); Daisuke Tsuchimoto, Kanagawa (JP); Masataka Iyadomi, Kanagawa (JP); Shin Nakamura, Kanagawa (JP)

(73) Assignees: SUNTORY HOLDINGS LIMITED, Osaka (JP); NIPPON CLOSURES CO., LIMITED, Tokyo (JP)

( * ) Notice: Subject to any disclaimer, the term of this patent is extended or adjusted under 35 U.S.C. 154(b) by 908 days.

(21) Appl. No.: 16/971,039

(22) PCT Filed: Dec. 20, 2018

(86) PCT No.: PCT/JP2018/046927
§ 371 (c)(1),
(2) Date: Aug. 19, 2020

(87) PCT Pub. No.: WO2019/159528
PCT Pub. Date: Aug. 22, 2019

(65) Prior Publication Data
US 2021/0086954 A1 Mar. 25, 2021

(30) Foreign Application Priority Data
Feb. 19, 2018 (JP) .................................. 2018-026925

(51) Int. Cl.
*B65D 41/04* (2006.01)
*C08L 23/06* (2006.01)

(52) U.S. Cl.
CPC .......... *B65D 41/0421* (2013.01); *C08L 23/06* (2013.01); *C08L 2207/04* (2013.01); *C08L 2207/066* (2013.01)

(58) Field of Classification Search
CPC . B65D 41/0421; C08L 23/06; C08L 2207/04; C08L 2207/066
See application file for complete search history.

(56) References Cited

U.S. PATENT DOCUMENTS

| 2004/0161560 A1 | 8/2004 | Baranowski |
| 2013/0112688 A1 | 5/2013 | Krikor et al. |
| 2014/0295028 A1 | 10/2014 | Carmichael et al. |

FOREIGN PATENT DOCUMENTS

| CN | 1452579 | 10/2003 |
| CN | 206125815 | 4/2017 |

(Continued)

OTHER PUBLICATIONS

English machine translation of JP 2000-038495A. (Year: 2000).*
(Continued)

*Primary Examiner* — John E Uselding
(74) *Attorney, Agent, or Firm* — SMITH, GAMBRELL & RUSSELL, LLP

(57) ABSTRACT

An oxygen-shielding container lid according to the present invention comprises a high density polyethylene cap shell 1 having a skirt section 7 and a top plate section 5 provided with an inner ring 9 for intimate contact with an inner surface of a container mouth; and an in-shell molded body 3 provided in a portion of an inner surface of the top plate section which is surrounded with the inner ring 9. The in-shell molded body 3 is composed of a primary molded body 3a which has been formed by in-shell molding on the inner surface of the top plate section and which has an oxygen shielding function; and a secondary molded body 3b which has been formed on the primary molded body 3a by (Continued)

in-shell molding so as to cover the primary molded body 3a and to be fused and fixed to the inner surface of the top plate section at the peripheral edge of the primary molded body. A resin composition used for formation of the secondary molded body 3b contains linear low density polyethylene, and has a melt flow rate at 190° C. of 1 to 10 g/10 minutes, a density of 0.900 to 0.920 g/cm$^3$, and a nominal tensile strain at break, as defined by JIS K-6922-2, of 400% or more.

1 Claim, 3 Drawing Sheets

(56) References Cited

FOREIGN PATENT DOCUMENTS

| | | | | |
|---|---|---|---|---|
| EP | 0970893 | 12/2000 | | |
| JP | 62-48965 | 3/1987 | | |
| JP | 9-132680 | 5/1997 | | |
| JP | 2000038495 A | * | 2/2000 | ............. C08L 53/02 |
| JP | 2004-123216 | 4/2004 | | |
| JP | 4601132 | 10/2010 | | |
| JP | 2011-111579 | 6/2011 | | |
| JP | 2013-523535 | 6/2013 | | |
| JP | 2013-534884 | 9/2013 | | |
| JP | 2014-531198 | 11/2014 | | |
| WO | 99/37554 | 7/1999 | | |
| WO | 2010-115992 | 10/2010 | | |

OTHER PUBLICATIONS

Office Action dated Dec. 3, 2021 for Chinese Appl. No. 2018800896788 with machine translation.
Search Report issued by Chinese Patent Office, Dec. 3, 2021.

* cited by examiner

CONTAINER LID HAVING OXYGEN SHIELDING PROPERTIES

TECHNICAL FIELD

This invention relates to a container lid having a high density polyethylene cap shell to be mounted on a container mouth, and an in-shell molded body formed within the cap shell by in-shell molding.

Plastic caps have so far been formable in various shapes, and have found wide use as lid materials for containers of various shapes. Of them, high density polyethylene caps are highly crystallized, excellent in mechanical strength, and also inexpensive. Thus, they are practically used at an extremely high frequency.

In recent years, further added value has sometimes been pursued for plastic caps, and various functions such as improved barrier properties aimed at preventing deterioration of liquid contents have often been required of plastic caps. In particular, plastic caps are low in oxygen shielding properties as compared with metallic caps, and thus have long faced the challenge of enhancing the oxygen shielding properties. That is, with containers such as plastic bottles, the oxygen shielding properties can be improved greatly by imparting a multilayer structure to the container wall, and providing a resin layer having gas barrier properties, such as ethylene vinylalcohol, or an oxygen absorbing layer having an oxidizable material dispersed therein. In the case of the cap, however, it is difficult to mold the cap without impairing its original openability or sealability, and the adoption of such a multilayer structure is unrealistic. The cap improved in the oxygen shielding properties, therefore, has not yet been put to practical use.

Proposals have also been made for various container lids which are each provided with a molded body of an oxygen absorber-containing resin on the inner surface of a cap in an attempt to remove oxygen in a head space within a container filled with liquid contents. In such a container lid, it is common practice to incorporate an oxygen absorber into a liner material provided on the inner surface of a cap shell by in-shell molding (e.g., Patent Document 1).

Recently, on the other hand, a container lid (closure) with oxygen shielding properties improved by a measure entirely different from conventional methods has been proposed (see, for example, Patent Document 2).

That is, this container lid has a hydrogen generator, such as a metal hydride, dispersed within a liner provided inside a plastic cap shell so that hydrogen is generated upon contact with water in a container. This hydrogen is reacted with oxygen via a catalyst and converted into water, thereby decreasing oxygen.

However, the liner of the container lid contains the hydrogen generator. If the water in the container directly contacts the liner, the hydrogen generator is immediately consumed, and no hydrogen shielding properties are exhibited any more. The above liner, therefore, may require a cover member for preventing direct contact with the contents of the container.

The above cover member needs to cover the liner completely without forming a clearance, and thus has to be provided inside the cap shell by in-shell molding. A mechanical means such as inlaying necessarily forms a clearance, although tiny, through which hydrogen generated leaks, or liquid contents enter. If the cover member is to be formed by in-shell molding, as above, a resin melt for formation of the cover member should be fallen onto the hydrogen generator-containing liner provided beforehand on the inner surface of the cap shell. The resin melt should be shaped by pressing using a molding punch, and then cooled, whereby the cover member is formed.

Here, the resin melt for cover member formation has to spread rapidly upon pressing with the punch so as to cover the liner material completely, and also has to be directly fused to the inner surface of the cap shell at the peripheral edge. That is, the cover member must fulfill the requirements that the resin melt excels in flowability, and is firmly fused and fixed to the inner surface of the cap shell at the small-area site of the peripheral edge. Unless the flowability and the fusion-fixability to the inner surface of the cap shell are enhanced, the excellent oxygen shielding properties of the liner material cannot be exhibited, and those abilities need to be improved.

The above-described challenges can exist also when trying to impart oxygen shielding properties with the use of a gas barrier resin such as ethylene vinylalcohol, or a liner formed using an oxygen absorber. In specifications in which direct contact with liquid contents of the container should be avoided, for example, the same cover member may be needed.

PRIOR ART DOCUMENTS

Patent Documents

Patent Document 1: Japanese Patent No. 4601132
Patent Document 2: JP-T-2013-523535

SUMMARY OF THE INVENTION

Problems to be Solved by the Invention

It is an object of the present invention, therefore, to provide an oxygen shielding container lid having a cap shell to be mounted on a container mouth, and an in-shell molded body provided on the inner surface of the cap shell, wherein when oxygen shielding properties are imparted to the in-shell molded body, direct contact between the material showing oxygen shielding properties and the contents of a container is reliably prevented, and the oxygen shielding properties are maintained stably for a long term.

It is another object of the invention to provide an in-shell molding resin composition which, when in-shell molded within a cap shell, can form a molded body to be firmly fusion-bonded to the inner surface of the cap shell.

Means for Solving the Problems

According to the present invention, there is provided a container lid comprising a high density polyethylene cap shell having a skirt section and a top plate section provided with an inner ring for intimate contact with an inner surface of a container mouth, and an in-shell molded body provided in a portion of the inner surface of the top plate section which is surrounded with the inner ring, wherein the in-shell molded body is composed of a primary molded body, which has been formed by in-shell molding on the inner surface of the top plate section and which has an oxygen shielding function, and a secondary molded body which has been formed on the primary molded body by in-shell molding so as to cover the primary molded body and to be fused and fixed to the inner surface of the top plate section at the peripheral edge of the primary molded body, and the secondary molded body has been formed from a resin composition containing linear low density polyethylene and having a melt flow rate at 190° C. of 1 to 10 g/10 minutes, a density of 0.900 to 0.920 g/cm$^3$, and a nominal tensile strain at break, as defined by JIS K-6922-2, of 400% or more.

In the container lid of the present invention, the following features are preferred:

(1) The secondary molded body contains a thermoplastic elastomer in addition to the linear low density polyethylene.

(2) The content of the thermoplastic elastomer in the secondary molded body is 30% by mass or less.

According to the present invention, there is also provided an in-shell molding resin composition comprising a blend of linear low density polyethylene and a thermoplastic elastomer, and having a melt flow rate at 190° C. of 1 to 10 g/10 minutes, a density of 0.900 to 0.920 g/cm$^3$, and a nominal tensile strain at break, as defined by JIS K-6922-2, of 400% or more.

Effects of the Invention

The container lid of the present invention has a basic structure in which the in-shell molded body has been provided on the inner surface of the top plate section of the high density polyethylene (HDPE) cap shell. Its particularly important features are that the in-shell molded body is composed of the primary molded body having an oxygen shielding function, and the secondary molded body formed on the primary molded body by in-shell molding so as to cover the primary molded body and to be fused and fixed to the inner surface of the top plate section at the peripheral edge of the primary molded body, and that the secondary molded body is formed using specific linear low density polyethylene (LLDPE).

That is, the primary molded body is an oxygen shielding molded body containing a functional material having an oxygen shielding function, whereas the secondary molded body also functions as a cover member which prevents direct contact between the functional material in the primary molded body and the contents of the container, and simultaneously limits the penetration of, say, water from inside the container into the primary molded body, thereby preventing a decline in the function of the functional material in order to suppress the exhaustion of the oxygen shielding properties.

With the present invention, the secondary molded body is formed using the resin composition containing LLDPE and having a certain melt flow rate (MFR), a certain density, and a certain nominal tensile strain at break. Thus, the secondary molded body, in-shell molded on the primary molded body, can coat the primary molded body completely, and can be firmly fused and fixed to the inner surface of the cap shell made of HDPE. Hence, the oxygen shielding properties that the functional material in the primary molded body shows can be stably exhibited for a long period of time.

MODE FOR CARRYING OUT THE INVENTION

Figure 1:
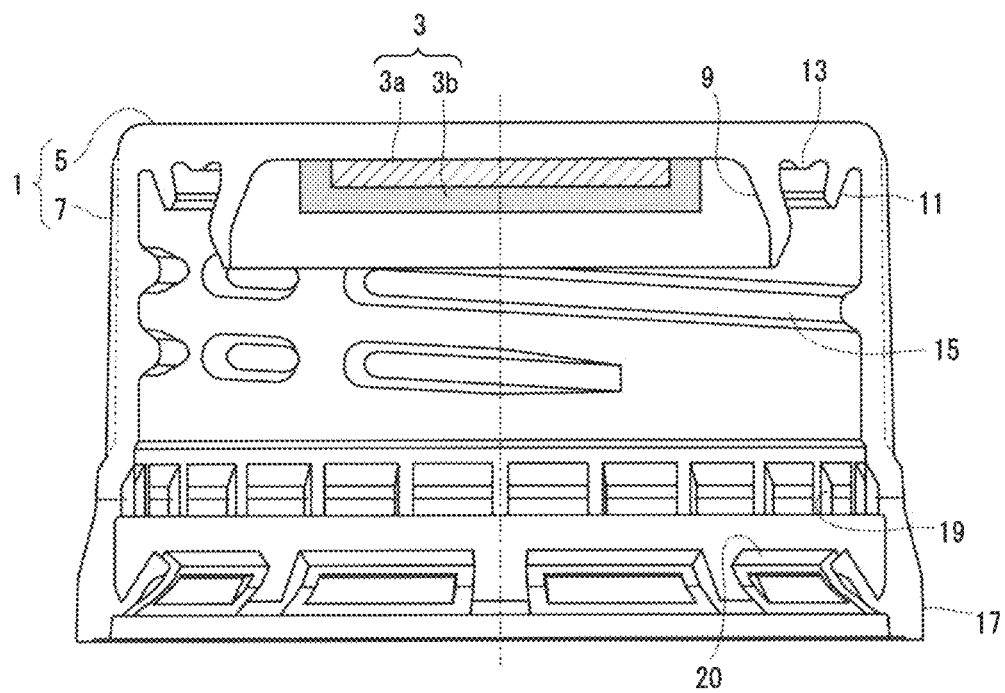
FIG. 1 is a side sectional view of a container lid according to the present invention.

By reference to FIG. 1 showing the structure of a container lid according to the present invention, this container lid is composed of a cap shell 1, and an in-shell molded body 3 molded inside the cap shell 1 by in-shell molding.

The cap shell 1 has a top plate section 5, and a skirt 7 suspending from the peripheral edge of the top plate section 5.

An inner ring 9 is formed on the inner surface of the top plate section 5. An outer ring 11 with a small height is formed outwardly of the inner ring 9. Further, a small annular projection 13 with a flat top is provided between the inner ring 9 and the outer ring 11.

That is, when the container lid is fitted onto the mouth of a container by seaming, the container mouth (not shown) enters the space between the inner ring 9 and the skirt 7. As a result, the outer surface of the inner ring 9 makes intimate contact with the inner surface of an upper end part of the container mouth, whereby sealing properties are ensured. For this purpose, the inner ring 9 is in an outwardly bulging shape.

The outer ring 11 is formed in such a manner as to be inclined slightly inwardly and be brought into intimate contact with the outer surface of the upper end part of the container mouth entering between the inner ring 9 and the skirt 7. Because of this configuration, the container mouth is firmly held without rattling, and sealing by the inner ring 9 is simultaneously reinforced.

Furthermore, the small annular projection 13 makes intimate contact with the upper end surface of the container mouth entering between the inner ring 9 and the skirt 7, thus further reinforcing the sealing by the inner ring 9.

On the other hand, a thread 15 to be threadedly engaged with the outer surface of the container mouth is provided on the inner surface of the skirt 7. Further, a tamper-evident band (TE band) 17 is coupled to the lower end of the skirt 7 via a breakable bridge 19.

The TE band 17 is provided for preventing tampering and for quality assurance of the contents of the container, and has an inner surface provided with a flap piece 20 extending inwardly and upwardly.

That is, the threaded engagement utilizing the thread 15 allows the container mouth to enter between the inner ring 9 and the skirt 7, thereby fixing the cap shell 1 to the container mouth. In this capped state, the flap piece 20 of the TE band 17 is located below a jaw section formed on the outer surface of the container mouth. Thus, when the cap shell 1 is turned in an uncapping direction for removal from the container mouth, the skirt 7 ascends along the outer surface of the container mouth, while the TE band 17 is inhibited from ascending, because the flap piece 20 abuts on the jaw section. Consequently, the bridge 19 coupling the TE band 17 and the skirt 7 is broken, whereupon the cap shell 1 is disengaged from the container mouth, with the TE band 17 remaining on the container side.

A general consumer, who sees the TE band 17 separated from the cap shell 1, can recognize such a history of unsealing that the cap shell 1 was removed from the container mouth, and can prevent fraudulent use such as tampering. When the TE band 17 is coupled to the cap shell 1, moreover, it can be recognized that the cap shell 1 has not been detached from the container mouth, and the quality of the contents can be guaranteed.

In the present invention, the above-described cap shell 1 is molded by injection molding or compression molding using high density polyethylene. The high density polyethylene is polyethylene having a high density of 0.942 g/cm³ or more, having few branches, and having high crystallinity. Since it is excellent in mechanical strength, it is very suitable for molding of the cap shell 1 having a portion requiring strength, such as the thread 15. It is mainly used as a cap for applications involving aseptic filling.

Since such high density polyethylene is used to form the cap shell 1 by injection molding or compression molding, one of the so-called injection grade, for example, one having MFR (190° C.) of 2.0 to 12.0 g/10 min is used suitably. In the compression grade, one having MFR (190° C.) of 0.5 to 10.0 g/10 min, for example, is used suitably.

In the container lid of the present invention, the interior of the cap shell 1, namely, a portion of the inner surface of the top plate section 5 surrounded with the inner ring 9, is provided with the in-shell molded body 3 molded by in-shell molding. This in-shell molded body 3 exhibits oxygen shielding properties, and can effectively prevent the oxidative degradation of the contents of the container. The in-shell molded body 3, moreover, is molded by in-shell molding at a part inward of the inner ring 9, and thus does not adversely affect the essential opening or sealing properties of the cap.

The foregoing in-shell molded body 3 has a two-layer structure, and is composed of a primary molded body 3a molded by in-shell molding in a first stage, and a secondary molded body 3b molded on the resulting primary molded body 3a by in-shell molding in a second stage so as to cover the primary molded body 3a.

Figure 2:
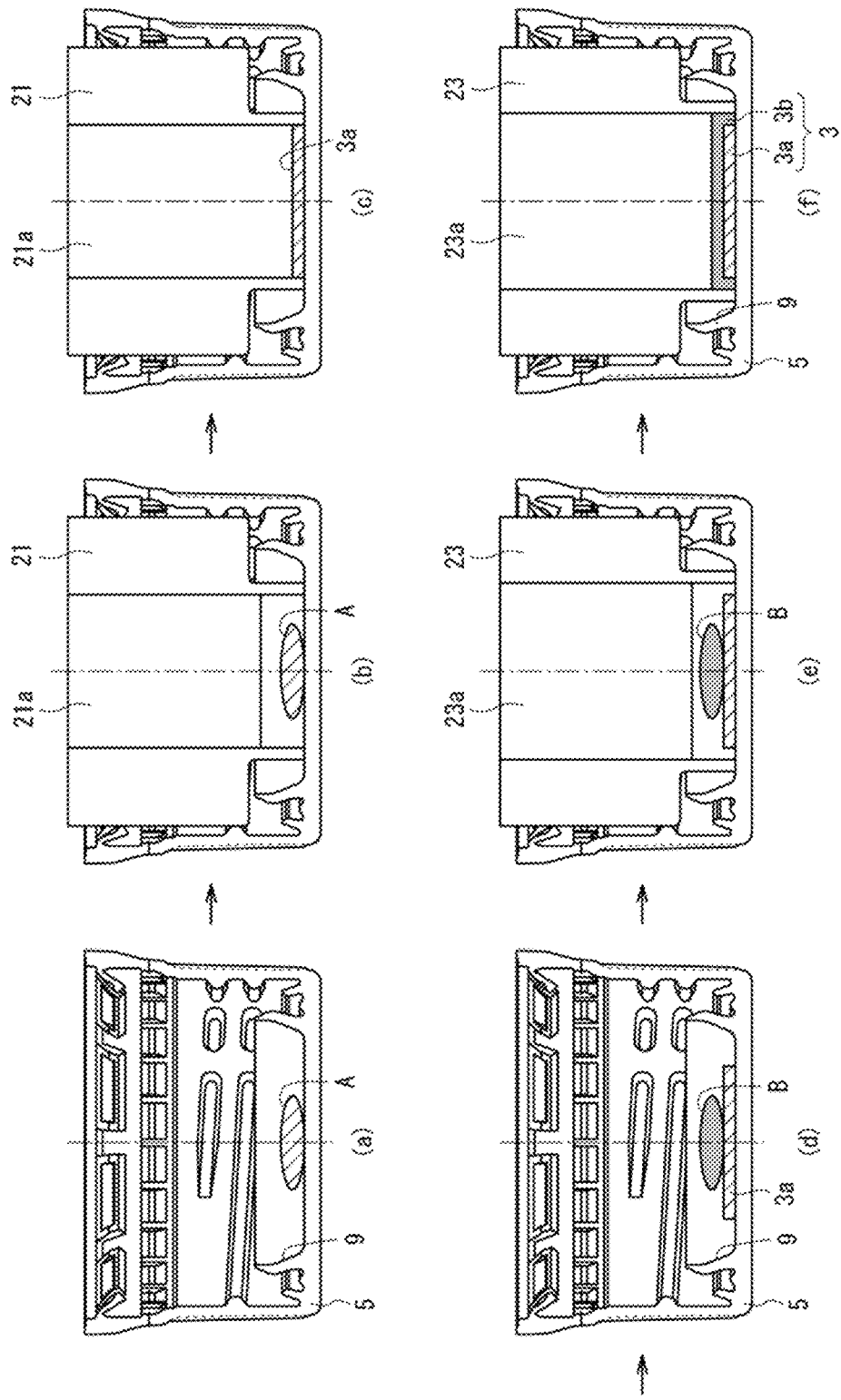
FIGS. 2(a) to 2(f) are views showing a process for molding an in-shell molded body.

FIGS. 2(*a*) to 2(*f*) will be referred to for showing a process for molding the above-mentioned in-shell molded body 3. First, a resin or resin composition for forming the primary molded body 3a is dropped, as a melt A at a temperature of the order of 250° C., from an extruder or the like onto a region of the inner surface of the top plate section 5 surrounded with the inner ring 9 (a central region thereof, in particular) (see FIG. 2(*a*)).

Then, a primary molding jig 21 equipped with a molding punch 21a is disposed within the cap shell 1 (see FIG. 2(*b*)).

In this state, the molding punch 21a is lowered to press and spread the melt A, thereby press-molding it into a flat disk shape, while cooling it (see FIG. 2(*c*)). As a result, the primary molded body 3a adhered to the inner surface of the top plate section 5 is formed.

After the primary molded body 3a has been formed in the above manner, a resin or resin composition for forming the secondary molded body 3b is dropped, as a melt B at a temperature of the order of 250° C., from an extruder or the like onto the primary molded body 3a (see FIG. 2(*d*)).

Then, a secondary molding jig 23 equipped with a molding punch 23a is disposed within the cap shell 1 (see FIG. 2(*e*)).

In this state, the molding punch 23a is lowered to press and spread the melt B, thereby press-molding it into a flat disk shape, while cooling it (see FIG. 2(*f*)). As a result, the secondary molded body 3b adhered to the inner surface of the top plate section 5 so as to cover the primary molded body 3a is formed. In this manner, the in-shell molded body 3 of a two-layered structure is obtained.

<Primary Molded Body 3a>

In the above-described in-shell molded body 3 that the container lid of the present invention has, the primary molded body 3a exhibits the oxygen shielding properties as stated earlier.

This primary molded body 3a is roughly classified into two types depending on means for allowing it to exhibit the oxygen shielding properties.

One of the types is called an active barrier type for eliminating oxygen by use of a chemical reaction, and an oxygen absorber type or a hydrogen generation type is present.

The oxygen absorber type will be described. An oxygen absorber for use in an oxygen absorbing resin composition, as is described in JP-A-2002-240813, is present as a layer containing an oxidizable polymer and a transition metal-based catalyst. Under the action of the transition metal-based catalyst, the oxidizable polymer undergoes oxidation with oxygen, and thereby absorbs oxygen to block the passage of oxygen. The oxidizable polymer and the transition metal-based catalyst are explained in detail in the above JP-A-2002-240813, and their details will be omitted herein. However, typical examples of the oxidizable polymer include olefin resins having tertiary carbon atoms (e.g., polypropylene, polybutene-1, or their copolymers); thermoplastic polyesters or aliphatic polyamides; xylylene group-containing polyamide resins; and ethylenically unsaturated group-containing polymers (e.g., polymers derived from polyenes such as butadiene). The transition metal-based catalyst is typified by inorganic salts, organic acid salts, or complex salts of transition metals such as iron, cobalt, and nickel.

The above oxygen absorber can be used as blended with polyethylene or an acid-modified olefin resin modified with maleic anhydride, in such a proportion as to be capable of maintaining moderate oxygen shielding properties, as is the aforementioned gas barrier resin, in order to ensure adhesion to the high density polyethylene that forms the cap shell 1.

The hydrogen generation type will be described. The hydrogen generation type refers to a type in which a hydrogen generator is dispersed, as a functional material, in a resin. The hydrogen generator reacts with water, which has migrated from liquid contents inside the container, to generate hydrogen. This hydrogen reacts with oxygen, which has passed through the top plate section 5 of the cap shell 1, or oxygen present inside the container, via the catalyst to generate water, whereby oxygen is trapped. In this manner, oxygen shielding properties are exhibited.

The hydrogen-generating primary molded body 3a as described above has been rendered publicly known by the aforementioned Patent Document 1, etc.

Representative of the hydrogen generator are metals which generate hydrogen upon reaction with water, or metal hydrides thereof, including, for example, metals such as Na, Li, K, Ca, Mg, Mg, Zn, and Al, and hydrides of these metals. Other examples are sodium borohydride, lithium borohydride, tetramethyldisiloxane, trimethyltin hydride, and organohydrogenpolysiloxane. Depending on the type of the contents of the container, a suitable one of them may be selected and used.

The resin serving as a matrix in which the above hydrogen generator is to be dispersed can be exemplified by a resin having water permeability, for example, an olefin resin such as low, medium or high density polyethylene or polypropylene, styrene-ethylene-butylene copolymer (SEBS), polyamide, polystyrene, styrene-(meth)acrylate copolymer, and ethylene-vinyl acetate copolymer. From the viewpoint of adhesion to the inner surface of the top plate section 5 of the cap shell 1 or to the secondary molded body 3b, or the viewpoint of in-shell moldability, in particular, the olefin resin, particularly, polyethylene having MFR of the order of 1 to 10 g/10 min is preferred, and LLDPE for use in the molding of the secondary molded body 3b to be described later is used most preferably.

The above-mentioned hydrogen generator is incorporated, usually, in an amount of the order of 5 to 20 parts by mass per 100 parts by mass of the above resin.

The other type is a type which directly shields oxygen, called a passive barrier type, the type in which a resin itself prevents the entry of oxygen from the outside. The primary molded body 3a of this type is formed from a gas barrier resin.

As the above gas barrier resin, ethylene-vinyl alcohol copolymer (ethylene-vinyl acetate copolymer saponification product) and aromatic polyamide are representative. From the aspect of oxygen shielding properties, in particular, the ethylene-vinyl alcohol copolymer is preferred.

Moreover, the gas barrier resin is poor in adhesion to the polyolefin forming the cap shell 1. Thus, it can be used as blended with polyethylene or an acid-modified olefin resin modified with maleic anhydride, in such a proportion as to be capable of maintaining moderate oxygen shielding properties.

Any of the types of the primary molded body 3a described above is molded by in-shell molding in accordance with the process shown in the aforementioned FIGS. 2(a) to 2(f).

<Secondary Molded Body 3b>

The secondary molded body 3b provided so as to cover the above-described primary molded body 3a is designed to prevent direct contact between the primary molded body 3a and the contents of the container.

That is, the primary molded body 3a containing the aforementioned hydrogen generator needs to prevent contact between the hydrogen generator and the contents of the container. This is because if the hydrogen generator and the contents of the container directly contact, water contained in the contents of the container and the hydrogen generator immediately react, thereby causing an immediate loss of the function of the hydrogen generator. The same is true of the primary molded body 3a containing the oxygen absorber. Furthermore, a gas barrier resin such as ethylene-vinyl alcohol copolymer absorbs water or the like, and greatly declines in its oxygen shielding function. Hence, the primary molded body 3a composed of such a gas barrier resin also needs to be prevented from direct contact with the contents of the container.

In order to prevent direct contact with the primary molded body 3a and enable its oxygen shielding properties to be exhibited persistently, as mentioned above, the secondary molded body 3b is provided.

The secondary molded body 3b, therefore, needs to be molded by in-shell molding, and also fused and fixed to the inner surface of the top plate section 5 in such a manner as to completely cover and seal the primary molded body 3a.

In the present invention, therefore, it is necessary that a resin material (resin composition) for use in the molding of the secondary molded body 3b contains linear low density polyethylene (LLDPE). The LLDPE has ethylene copolymerized with a small amount of α-olefin (generally having 4 or more carbon atoms), and has the properties that it has few long-chain molecules, its linearity is very high, and it is practically free from entanglement of the polymer chain. If the secondary molded body 3b involving the LLDPE is used, in-shell molding on the primary molded body 3a makes it possible to coat the primary molded body 3a completely and, at its peripheral edge, firmly fuse and fix the secondary molded body 3b to the cap shell 1 made of high density polyethylene (the inner surface of the top plate section 5). Since the LLDPE has high molecular linearity, it is easily entangled with the molecular chain of the high density polyethylene. Thus, the secondary molded body 3b is firmly fused and fixed to the inner surface of the top plate section 5. Since the crystallinity of the LLDPE is high, moreover, the blocking properties of the secondary molded body 3b against water are also high.

It is also necessary for the resin material of the secondary molded body 3b used in the present invention to have MFR (190° C.) in the range of 1 to 10 g/10 min.

That is, if the MFR is higher than the above range, the aforementioned melt B easily flows, making it difficult to effectively perform press molding with the punch 23a. If the MFR is lower than the above range, the melt B minimally spreads when press-molded with the punch 23a, thus posing difficulty in molding. In this case, the melt B can be easily spread by making the temperature of the melt B high. Since the temperature of the melt B becomes excessively high, however, there arises the disadvantage of causing deformation or a loss of shape to the primary molded body 3a or to the inner surface of the top plate section 5 of the cap shell 1, or causing yellowing of the resin.

Furthermore, the resin material for the secondary molded body 3b needs to have a density of 0.900 to 0.920 g/cm$^3$, and a nominal tensile strain at break (JIS K-6922-2) of 400% or more. The resin material having such a density and such a nominal tensile strain at break is easily extensible, can be adjusted to such a thickness as to be moderately permeable to water, and is capable of preventing the disadvantage of the hydrogen generator being consumed at a stroke. Alternatively, the melt B can be stretched and press-molded so as to cover the peripheral edge of the primary molded body 3a completely and, at the peripheral edge, the secondary molded body 3b can be firmly fused and fixed to the inner surface of the top plate section 5. For example, the resin material whose density and nominal tensile strain at break are outside the above ranges does not enable the secondary molded body 3b to be firmly fused and fixed to the inner surface of the top plate section 5, and makes the secondary molded body 3b susceptible to peeling or the like. With the primary molded body 3a of the type using the hydrogen generator, in particular, water contacts it at a stroke, resulting in the immediate exhaustion of the hydrogenating agent. Thus, it becomes difficult to capture oxygen by hydrogen generation from the hydrogen generator. Eventually, the oxygen shielding function cannot be fully exhibited.

The LLDPE as described above is obtained by making adjustments to the type, the amount of copolymerization of, the molecular weight, etc. of the α-olefin to be copolymerized. Usually, from among commercially available LLDPE's, LLDPE having the required physical properties may be selected and used. For example, the LLDPE used in the present invention is marketed under the trade name of UF240 by Japan Polyethylene Corporation.

In the present invention, LLDPE can be used alone, or as a blend with other resin or elastomer, as the resin material for the secondary molded body 3b. If the blend containing LLDPE is used, it is necessary for this blend to satisfy the aforementioned conditions such as MFR, density, and nominal tensile strain at break. With the present invention, it is desirable, for example, that LLDPE be used after being mixed with a thermoplastic elastomer, in a range where these conditions concerned with the physical properties such as MFR are satisfied. Owing to mixing with the thermoplastic elastomer, the melt B comes to have moderate flowability at a lower temperature, and becomes easily adherent to the primary molded body 3a and the inner surface of the top plate section 5. The incorporation of such a thermoplastic elastomer brings the nominal tensile strain at break (JIS K-6922-2) to a greater value, so that the melt B is further extensible, and is easier to spread by pressing.

Examples of the above thermoplastic elastomer are ethylene-based elastomers such as ethylene-propylene copolymer rubber (EPR), ethylene-butylene copolymer rubber (EBR), and ethylene-octene copolymer rubber (EOR). Styrene-based elastomers and propylene-based elastomers are also usable. Particularly when the hydrogen generator is used in the primary molded body, ethylene-butylene copolymer rubber (EBR) is preferably used to increase hydrogen permeability.

In the present invention, the incorporation of the thermoplastic elastomer is advantageous for enhancing adhesion to the primary molded body 3a and the inner surface of the top plate section 5. If its incorporation is excessive, however, while the melt B is being dropped for molding of the secondary molded body 3b, the position of dropping of the melt B may be unstable and may deviate from the center of the primary molded body 3a. Thus, the amount of the thermoplastic elastomer incorporated is preferably in the range of 30% by mass or less, particularly 10 to 30% by mass, in the secondary molded body 3b to be formed.

From the viewpoint of improvement in the adhesion to the primary molded body 3a and the inner surface of the top plate section 5, the MFR (190° C.) of the resin material for the secondary molded body 3b is desirably in the range of 2.3 to 4.0 g/10 min.

The resin composition containing the above-mentioned LLDPE and thermoplastic elastomer can form a molded product excellent in adhesion to various olefin resins when subjected to in-shell molding. Thus, it can be used for molding of various in-shell molded products as well as the secondary molded body 3b.

Figure 3:
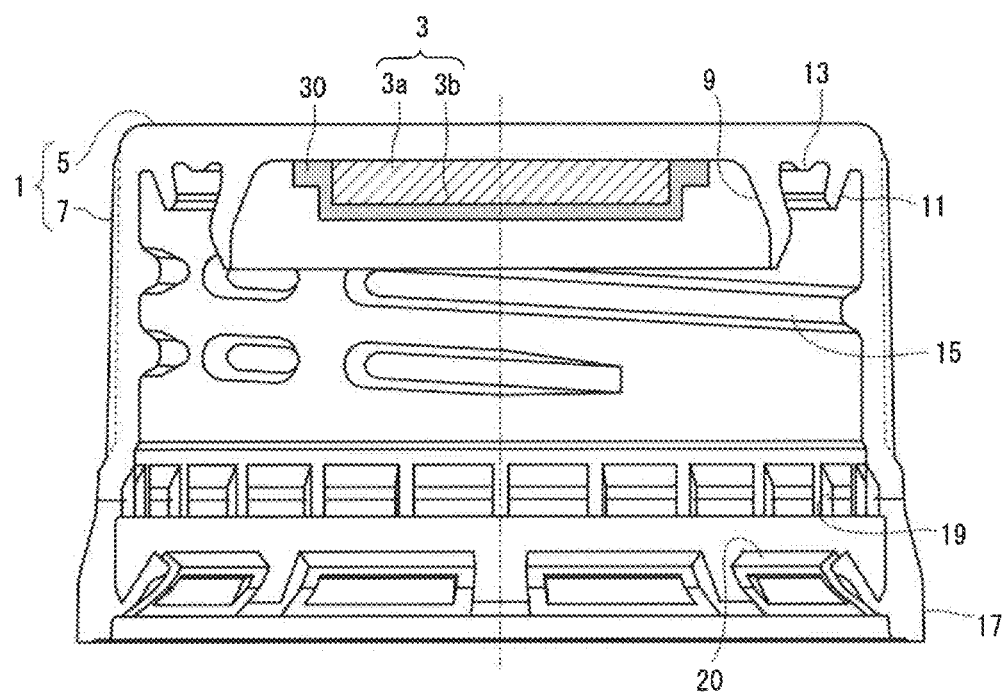
FIG. 3 is a view showing a preferred embodiment of a secondary molded body in the in-shell molded body provided in the container lid of the present invention.

When subjected to in-shell molding, the melt B is very easily extensible. Thus, the secondary molded body 3b composed of LLDPE mentioned above is optimally formed into a shape having an outwardly widened flange 30 at a site covering the peripheral edge of the primary molded body 3a, for example, as shown in FIG. 3. By so doing, the primary molded body 3a can be completely covered, and the area of contact with the inner surface of the top plate section 5 can be set to be large. Thus, the secondary molded body 3b can be fused and fixed to the inner surface of the top plate section 5 more firmly. In particular, LLDPE incorporating the aforementioned thermoplastic elastomer is most preferred for the formation of the above flange 30.

EXAMPLES

The excellent effects of the present invention will be explained by the following experimental examples.

<Preparation of a Testing Cap>

A cap shell of a shape as shown in FIG. 1 was provided by injection molding using high density polyethylene having a density of 0.960 g/cm$^3$ and MFR (190° C.) of 2.0 g/10 min. The specifications for this cap shell were as follows:

Cap diameter (outer diameter of the top plate section): 28 mm

Inner diameter at the base of the inner ring: 18.5 mm

Then, a primary molded body with a diameter of 14 mm and a thickness of 3 mm was molded by inner molding (molding temperature: 250° C.) using a resin composition having the following formulation, and the resulting product was used as a testing cap:

Resin composition for the primary molded body:
Linear low density polyethylene (LLDPE) 87.95 parts by mass
 Density: 0.919 g/cm$^3$
 MFR: 5.7 g/10 min (190° C.)
 Nominal tensile strain at break (JIS K-6922-2): 500% or more
Hydrogen generator (sodium borohydride) 12 parts by mass
Colorant (phthalocyanine blue) 0.05 part by mass Example 1

The following LLDPE was provided:
LLDPE:
UF240, produced by Japan Polyethylene Corporation
Density: 0.920 g/cm$^3$
MFR: 2.1 g/10 min (190° C.)
Melting point: 123.0° C.
Nominal tensile strain at break (JIS K-6922-2): 500%

The above LLDPE was charged into a melt extruder, and melt-extruded from a molten resin feed hole. The extrudate was cut by a rotary blade provided at the exit of the feed hole. The resulting cut molten resin at 250° C. was dropped onto the center of the primary molded body of the above-mentioned testing cap (amount of the molten resin: 145 mg). The dropped resin was molded by in-shell molding into a secondary molded body (length of the flange: 1 mm) of a shape as shown in FIG. 3. In this manner, a container lid was prepared.

At the time of the above molding, the molten resin was stably dropped onto the center of the primary molded body, and the droppability of the molten resin was very satisfactory. Also, the molten resin could be stably cut, was stably held without extending off from the site on the primary molded body, and was moldable so as to completely cover the primary molded body without causing supply failure.

The resulting container lid was subjected to the adhesiveness test of the secondary molded body. A penetrant (colored liquid) was dripped around the secondary molded body, and the top plate section of this container lid was cut off. Then, the penetration of the liquid between the secondary molded body and the top plate section of the cap shell was checked. Slight coloring with the penetrant (a peeled portion without adhering) was observed, but the coloring did not reach the primary molded body, showing that the performance of the primary molded body was not affected. Moreover, the top plate section of the resulting container lid was cut off, and the flange of the secondary molded body was raised using a hook needle. Its adhesive force was measured and found to be 50N or more.

Example 2

The following thermoplastic elastomer was provided:
Thermoplastic elastomer (EBR):
Ethylene-butylene copolymer (A-40905, produced by Mitsui Chemicals, Inc.)
Density: 0.893 g/cm$^3$
MFR: 3.6 g/10 min (190° C.)
Melting point: 77.0° C.
Nominal tensile strain at break (JIS K-6922-2): 783%

90 Parts by mass of the LLDPE used in Example 1 and 10 parts by mass of the thermoplastic elastomer were dry-blended, melt-kneaded using the melt extruder, and extruded from the molten resin feed hole. In the same manner as in Example 1, the extrudate was cut, and the resulting cut molten resin at 250° C. was dropped onto the center of the primary molded body of the testing cap. The dropped resin was molded by in-shell molding into a secondary molded body of the shape shown in FIG. 3. In this manner, a container lid was prepared.

The above blend of the LLDPE and the thermoplastic elastomer had a density of 0.917 g/cm$^3$, MFR (190° C.) of 2.3 g/10 min, and a nominal tensile strain at break of 528.3%

At the time of the above molding, the molten resin was stably dropped onto the center of the primary molded body, and the droppability of the molten resin was very satisfactory, as in Example 1. Also, as in Example 1, the molten resin could be stably cut, was stably held without extending off from the site on the primary molded body, and was moldable so as to completely cover the primary molded body without causing supply failure.

The resulting container lid was subjected to an adhesiveness test, as in Example 1. At the peripheral edge, peeling occurred between the secondary molded body and the inner surface of the top plate section of the cap, but the degree of the peeling was lower than in Example 1. The adhesive force was 50N or more.

Example 3

A secondary molded body was molded by inner molding in exactly the same manner as in Example 2, except that 85 parts by mass of the LLDPE and 15 parts by mass of the thermoplastic elastomer (EBR) were dry-blended. In this manner, a container lid was obtained, and its evaluation was conducted.

The above blend of the LLDPE and the thermoplastic elastomer had a density of 0.916 g/cm$^3$, MFR (190° C.) of 2.3 g/10 min, and a nominal tensile strain at break of 542.5%

At the time of the above molding, the molten resin was stably dropped onto the center of the primary molded body, and the droppability of the molten resin was very satisfactory, as in Example 1. Also, as in Example 1, the molten resin could be stably cut, was stably held without extending off from the site on the primary molded body, and was moldable so as to completely cover the primary molded body without causing supply failure.

The resulting container lid was subjected to an adhesiveness test, as in Example 1. No peeling occurred between the secondary molded body and the inner surface of the top plate section of the cap as well as the primary molded body. The adhesive force was 50N or more.

Example 4

A secondary molded body was molded by inner molding in exactly the same manner as in Example 2, except that 80 parts by mass of the LLDPE and 20 parts by mass of the thermoplastic elastomer (EBR) were dry-blended. In this manner, a container lid was obtained, and its evaluation was conducted.

The above blend of the LLDPE and the thermoplastic elastomer had a density of 0.915 g/cm$^3$, MFR (190° C.) of 2.4 g/10 min, and a nominal tensile strain at break of 556.6%

At the time of the above molding, the molten resin was stably dropped onto the center of the primary molded body, and the droppability of the molten resin was very satisfactory, as in Example 1. Also, as in Example 1, the molten resin could be stably cut, was stably held without extending off from the site on the primary molded body, and was moldable so as to completely cover the primary molded body without causing supply failure.

The resulting container lid was subjected to an adhesiveness test, as in Example 1. No peeling occurred between the secondary molded body and the inner surface of the top plate section of the cap as well as the primary molded body. The adhesive force was 50N or more.

Example 5

A secondary molded body was molded by inner molding in exactly the same manner as in Example 2, except that 70 parts by mass of the LLDPE and 30 parts by mass of the thermoplastic elastomer (EBR) were dry-blended. In this manner, a container lid was obtained, and its evaluation was conducted.

The above blend of the LLDPE and the thermoplastic elastomer had a density of 0.912 g/cm$^3$, MFR (190° C.) of 2.6 g/10 min, and a nominal tensile strain at break of 584.9%

At the time of the above molding, the molten resin was stably dropped onto the center of the primary molded body, and the droppability of the molten resin was very satisfactory, as in Example 1. Also, as in Example 1, the molten resin could be stably cut, was stably held without extending off from the site on the primary molded body, and was moldable so as to completely cover the primary molded body without causing supply failure.

An adhesiveness test of the resulting container lid showed that no peeling occurred between the secondary molded body and the inner surface of the top plate section of the cap as well as the primary molded body. The adhesive force was 50N or more.

Example 6

A secondary molded body was molded by inner molding in exactly the same manner as in Example 2, except that 65 parts by mass of the LLDPE and 35 parts by mass of the thermoplastic elastomer (EBR) were dry-blended. In this manner, a container lid was obtained, and its evaluation was conducted.

The above blend of the LLDPE and the thermoplastic elastomer had a density of 0.911 g/cm$^3$, MFR (190° C.) of 2.6 g/10 min, and a nominal tensile strain at break of 599.5%

At the time of the above molding, the droppability of the molten resin was unstable. Although the molten resin was moldable so as to completely cover the primary molded body, it was dropped while deviating from the center of the primary molded body, and the cutting of the molten resin was unstable.

An adhesiveness test of the resulting container lid showed that no peeling occurred between the secondary molded body and the inner surface of the top plate section of the cap as well as the primary molded body. The adhesive force was 50N or more.

Example 7

A secondary molded body was molded by inner molding in exactly the same manner as in Example 2, except that 60 parts by mass of the LLDPE and 40 parts by mass of the thermoplastic elastomer (EBR) were dry-blended. In this manner, a container lid was obtained, and its evaluation was conducted.

The above blend of the LLDPE and the thermoplastic elastomer had a density of 0.909 g/cm$^3$, MFR (190° C.) of 2.7 g/10 min, and a nominal tensile strain at break of 613.2%

At the time of the above molding, the droppability of the molten resin was unstable. Although the molten resin was moldable so as to completely cover the primary molded body, it was dropped while deviating from the center of the primary molded body, and the cutting of the molten resin was unstable.

An adhesiveness test of the resulting container lid showed that no peeling occurred between the secondary molded body and the inner surface of the top plate section of the cap as well as the primary molded body. The adhesive force was 50N or more.

Example 8

The following thermoplastic elastomer was provided:
Thermoplastic elastomer (EBR):
Ethylene-butylene copolymer (A-4070S, produced by Mitsui Chemicals, Inc.)
Density: 0.870 g/cm$^3$
MFR: 3.6 g/10 min (190° C.)
Melting point: 55.0° C.
Nominal tensile strain at break (JIS K-6922-2): 1000%

A secondary molded body was molded by inner molding in exactly the same manner as in Example 2, except that 30 parts by mass of the thermoplastic elastomer were dry-blended with 70 parts by mass of the LLDPE. In this manner, a container lid was obtained, and its evaluation was conducted.

The above blend of the LLDPE and the thermoplastic elastomer had a density of 0.905 g/cm$^3$, MFR (190° C.) of 2.6 g/10 min, and a nominal tensile strain at break of 650%

At the time of the above molding, the molten resin was stably dropped onto the center of the primary molded body, and the droppability of the molten resin was very satisfactory, as in Example 1. Also, as in Example 1, the molten resin could be stably cut, was stably held without extending off from the site on the primary molded body, and was moldable so as to completely cover the primary molded body without causing supply failure.

An adhesiveness test of the resulting container lid showed that no peeling occurred between the secondary molded body and the inner surface of the top plate section of the cap as well as the primary molded body. The adhesive force was 50N or more.

The experimental results of Example 1 to 8 above show that when the thermoplastic elastomer is incorporated into the LLDPE, the adhesion between the secondary molded body and the inner surface of the top plate section of the cap as well as the primary molded body is enhanced; however, if the thermoplastic elastomer is incorporated excessively into the LLDPE, the droppability of the molten resin tends to be unstable. Thus, the proper amount of the thermoplastic elastomer incorporated is found to be 15 to 30% by mass.

Comparative Example 1

The following LLDPE was provided:
LLDPE:
SP2020, produced by Prime Polymer Co., Ltd.
Density: 0.923 g/cm$^3$
MFR: 1.9 g/10 min (190° C.)
Melting point: 116.0° C.
Nominal tensile strain at break (JIS K-6922-2): 346.2%

A secondary molded body was molded by inner molding in exactly the same manner as in Example 1, except that the above LLDPE was used. In this manner, a container lid was obtained, and its evaluation was conducted.

Comparative Example 2

The following LLDPE was provided:
LLDPE:
FV104, produced by SUMITOMO CHEMICAL CO., LTD.
Density: 0.913 g/cm$^3$
MFR: 1.0 g/10 min (190° C.)
Melting point: 121.0° C.
Nominal tensile strain at break (JIS K-6922-2): 236.2%

A secondary molded body was molded by inner molding in exactly the same manner as in Example 1, except that the above LLDPE was used. In this manner, a container lid was obtained, and its evaluation was conducted.

Comparative Example 3

A secondary molded body was molded by inner molding in exactly the same manner as in Comparative Example 2, except that the LLDPE in Comparative Example 2 was used, and 15 parts by mass of a thermoplastic elastomer (EBR) were dry-blended with 85 parts by mass of the LLDPE. In this manner, a container lid was obtained, and its evaluation was conducted.

The above blend of the LLDPE and the thermoplastic elastomer had a density of 0.910 g/cm$^3$, MFR (190° C.) of 1.4 g/10 min, and a nominal tensile strain at break of 325.6%.

Comparative Example 4

The following LLDPE was provided:
LLDPE:
FV201, produced by SUMITOMO CHEMICAL CO., LTD.
Density: 0.916 g/cm$^3$
MFR: 2.3 g/10 min (190° C.)
Melting point: 117.0° C.
Nominal tensile strain at break (JIS K-6922-2): 331.2%

A secondary molded body was molded by inner molding in exactly the same manner as in Example 1, except that the above LLDPE was used. In this manner, a container lid was obtained, and its evaluation was conducted.

Comparative Example 5

A secondary molded body was molded by inner molding in exactly the same manner as in Example 5 or 7, except that the LLDPE in Comparative Example 4 was used, and 30 parts by mass of the thermoplastic elastomer (EBR) were dry-blended with 70 parts by mass of the LLDPE. In this manner, a container lid was obtained, and its evaluation was conducted.

The above blend of the LLDPE and the thermoplastic elastomer had a density of 0.909 g/cm$^3$, MFR (190° C.) of 2.7 g/10 min, and a nominal tensile strain at break of 388.9%.

Comparative Example 6

The following very low density polyethylene (VLDPE) was provided:
VLDPE:
VL200, produced by SUMITOMO CHEMICAL CO., LTD.
Density: 0.900 g/cm$^3$
MFR: 2.0 g/10 min (190° C.)
Melting point: 115.0° C.
Nominal tensile strain at break (JIS K-6922-2): 900%

A secondary molded body was molded by inner molding in exactly the same manner as in Example 1, except that the above VLDPE was used. In this manner, a container lid was obtained, and its evaluation was conducted.

Comparative Example 7

The following low density polyethylene (LDPE) was provided:
LDPE:
F120N, produced by Ube-Maruzen Polyethylene Co., Ltd.
Density: 0.920 g/cm$^3$
MFR: 1.2 g/10 min (190° C.)
Melting point: 94.0° C.
Nominal tensile strain at break (JIS K-6922-2): 92.8%

A secondary molded body was molded by inner molding in exactly the same manner as in Example 1, except that the above LDPE was used. In this manner, a container lid was obtained, and its evaluation was conducted.

Comparative Example 8

A secondary molded body was molded by inner molding in exactly the same manner as in Example 3, except that the LDPE in Comparative Example 7 was used, and 15 parts by mass of the thermoplastic elastomer (EBR) were dry-blended with 85 parts by mass of the LDPE. In this manner, a container lid was obtained, and its evaluation was conducted.

The above blend of the LDPE and the thermoplastic elastomer had a density of 0.916 g/cm$^3$, MFR (190° C.) of 1.6 g/10 min, and a nominal tensile strain at break of 190.9%.

Comparative Example 9

The following high density polyethylene (HDPE) was provided:
HDPE:
2200J, produced by Prime Polymer Co., Ltd.
Density: 0.964 g/cm$^3$
MFR: 5.2 g/10 min (190° C.)
Melting point: 135° C.
Nominal tensile strain at break (JIS K-6922-2): 176.7%

A secondary molded body was molded by inner molding in exactly the same manner as in Example 1, except that the above HDPE was used. In this manner, a container lid was obtained, and its evaluation was conducted.

Comparative Example 10

A secondary molded body was molded by inner molding in exactly the same manner as in Example 3, except that the HDPE in Comparative Example 9 was used, and 15 parts by mass of the thermoplastic elastomer (EBR) were dry-blended with 85 parts by mass of the HDPE. In this manner, a container lid was obtained, and its evaluation was conducted.

The above blend of the HDPE and the thermoplastic elastomer had a density of 0.953 g/cm$^3$, MFR (190° C.) of 5.0 g/10 min, and a nominal tensile strain at break of 303%.

Comparative Example 11

The following high density polyethylene (HDPE) was provided:
HDPE:
HJ362N, produced by Japan Polyethylene Corporation
Density: 0.953 g/cm$^3$
MFR: 5.0 g/10 min (190° C.)
Melting point: 132° C.
Nominal tensile strain at break (JIS K-6922-2): 384.3%

A secondary molded body was molded by inner molding in exactly the same manner as in Example 1, except that the above HDPE was used. In this manner, a container lid was obtained, and its evaluation was conducted.

Comparative Example 12

A secondary molded body was molded by inner molding in exactly the same manner as in Example 3, except that the HDPE in Comparative Example 11 was used, and 15 parts by mass of the thermoplastic elastomer (EBR) were dry-blended with 85 parts by mass of the HDPE. In this manner, a container lid was obtained, and its evaluation was conducted.

The above blend of the HDPE and the thermoplastic elastomer had a density of 0.944 g/cm$^3$, MFR (190° C.) of 4.8 g/10 min, and a nominal tensile strain at break of 455.4%.

In Comparative Examples 1 to 12 offered above, the droppability of the molten resin posed no problems, and the molten resin could be stably cut, could be stably held without extending off from the site on the primary molded body, and was moldable so as to completely cover the primary molded body without causing supply failure.

The adhesiveness test of the resulting container lid, however, showed the following findings: Peeling occurred between the inner surface of the top plate section of the cap and the secondary molded body. Coloring with the penetrant reached the primary molded body, demonstrating that the function of the secondary molded body to cover the primary molded body was impaired.

Based on the results of Comparative Examples 1 to 12, it is clear that unless linear low density polyethylene (LLDPE) having a nominal tensile strain at break of 400% or more is used, excellent adhesion cannot be ensured between the secondary molded body and the inner surface of the top plate section of the cap as well as the primary molded body. For example, even when the nominal tensile strain at break was 400% or more, Comparative Example 6 using very low density polyethylene (VLDPE) presented unsatisfactory adhesion. Even in Comparative Example 12, which used high density polyethylene without using LLDPE and incorporated thermoplastic elastomer (EBR), thereby ensuring a nominal tensile strain at break of 400% or more, the adhesion obtained was not satisfactory.

EXPLANATIONS OF LETTERS OR NUMERALS

1: Cap shell
3: In-shell molded body
3a: Primary molded body
3b: Secondary molded body
5: Top plate section
7: Skirt
9: Inner ring
11: Outer ring
13: Small annular projection 15: Thread
17: TE band
19: Bridge
20: Flap piece
21: Primary molding jig
21a: Punch
23: Secondary molding jig
23a: Punch
30: Flange

The invention claimed is:

1. A container lid comprising a high density polyethylene cap shell having a skirt section and a top plate section provided with an inner ring for intimate contact with an inner surface of a container mouth, and an in-shell molded body provided in a portion of an inner surface of the top plate section which is surrounded with the inner ring,
- wherein the in-shell molded body is composed of a primary molded body, which has been formed by in-shell molding on the inner surface of the top plate section and which has an oxygen shielding function, and a secondary molded body which has been formed on the primary molded body by in-shell molding so as to cover the primary molded body and to be fused and fixed to the inner surface of the top plate section at a peripheral edge of the primary molded body,
- the primary molded body has a structure in which a hydrogen generator is dispersed in a matrix of an olefin resin, and
- the secondary molded body is formed from a resin composition containing linear low density polyethylene and a thermoplastic elastomer in an amount of 10 to 30% by mass, the resin composition having a melt flow rate at 190° C. of 1 to 10 g/10 minutes, a density of 0.900 to 0.920 g/cm3, and a nominal tensile strain at break, as defined by JIS K-6922-2, of 400% or more.

* * * * *